United States Patent [19]

Taguchi et al.

[11] Patent Number: 4,948,868
[45] Date of Patent: Aug. 14, 1990

[54] COPOLYAMIDE CONTAINING TERTIARY AMINE LINKAGE

[75] Inventors: Tohru Taguchi, Iwakuni; Yurimasa Zenitani, Saiki; Akio Ikeda, Ohtake; Toshiji Nishimura, Iwakuni, all of Japan

[73] Assignee: Mitsui Petrochemical Industries Ltd., Tokyo, Japan

[21] Appl. No.: 218,559

[22] Filed: Jul. 13, 1988

[30] Foreign Application Priority Data

Jul. 15, 1987 [JP] Japan ................ 62-177420

[51] Int. Cl.$^5$ .............................. C08G 69/26
[52] U.S. Cl. .................... 528/339; 528/338; 528/340; 528/347
[58] Field of Search ............... 528/339, 338, 340, 347

[56] References Cited

U.S. PATENT DOCUMENTS

| | | | |
|---|---|---|---|
| 2,430,923 | 11/1947 | Foster et al. | 525/427 |
| 2,443,486 | 6/1948 | Watkins | 525/427 |
| 2,859,208 | 11/1958 | Hollyday | 528/339 |
| 2,880,196 | 3/1959 | Frank et al. | 528/339 |

FOREIGN PATENT DOCUMENTS 1228022 10/1986 Japan.
2036458 2/1987 Japan.

Primary Examiner—Harold D. Anderson
Attorney, Agent, or Firm—Sherman & Shalloway

[57] ABSTRACT

A polyamide comprising from 60 to 100% by mole of divalent terephthaloylalkylenediamine constituent units (a), from 0 to 40% by mole of divalent diacyloylalkylenediamine constituent units (b) and from 0.1 to 5% by mole of trivalent diacyloylalkylenediamine units (c), said constituent units (a), (b) and (c) being arranged at random to provide a branched linear structure, said polyamide being free from a gel-forming cross-linked structure and soluble in concentrated sulfuric acid and having: an intrinsic viscosity [$\eta$] of from 0.5 to 3 dl/g, as measured in concentrated sulfuric acid at a temperature of 30° C., a melting point of from 280° C. to 370° C. and a glass transition temperature of from 100° C. to 160° C., as measured by means of a differential scanning calorimeter at a heating rate of 10° C./min., and a crystallinity of from 10 to 30%, as measured by X-ray diffractometry. The polyamide has an excellent gas-barrier property, and thus, it is useful in applications where a gas-barrier property is particularly required, alone or in blend or lamination with other melt-moldable polymers.

7 Claims, No Drawings

COPOLYAMIDE CONTAINING TERTIARY AMINE LINKAGE

FIELD OF THE INVENTION

The present invention relates to a polyamide which has excellent low water absorption, melt moldability, heat resistance, mechanical properties and particularly enhanced gas barrier property, and which is particularly useful as a material of containers or vessels. The invention also relates to use of such a polyamide.

BACKGROUND OF THE INVENTION

Glass has been widely used as a material of containers or vessels for seasonings, oils, beer, wines, refrigerant drinks such as carbonated drinks, cosmetics and detergents. While glass vessels are excellent in their gas-barrier property, because of their relatively high costs of manufacture they are normally recovered after service and re-used. Glass vessels, however, pose problems in that costs of transportation are expensive due to their considerably heavy weight and that they are liable to break and inconvenient to handle.

To eliminate the above-mentioned problems involved in glass vessels, plastic containers or vessels have become employed in place of glass vessels. Depending upon the nature of materials to be stored in plastic vessels, various plastics are employed to manufacture the vessels. Among others, because of its good transparency and gas-barrier property, polyethylene terephthalate has been adopted as a material of vessels for seasonings, refrigerant drinks, detergents and cosmetics.

However, in the case of vessels for beer and carbonated drinks where a requirement for the gas-barrier property is the most severe, polyethylene terephthalate is not necessarily satisfactory in this respect, and in consequence, it has been necessary to prepare thick wall vessels to meet the requirement.

On the other hand aliphatic polyamides such as nylon 6 and nylon 66 exhibit a better gas-barrier property in dry state than polyethylene terephthalate. Such polyamides normally have a water absorption on the order of 10%, and pose a problem in that when wet their gas-barrier property is worse than that of polyethylene terephthalate. To improve the water absorbing property of aliphatic polyamides, Japanese Patent Laid-Open Publication No. 60-195126 (1985) discloses crystalline polyamides containing cyclic hydrocarbon groups. Although the disclosed polyamides have an excellent gas-barrier property, resins having a further improved gas-barrier property are desired in the art.

OBJECT OF THE INVENTION

An object of the invention is to provide a polyamide which has excellent enhanced gas barrier property in addition to low water absorption, melt moldability, heat resistance and mechanical properties, and which is particularly useful as a material of containers or vessels capable of containing or storing gas-containing liquid goods such as beer and carbonated drinks for prolonged period of time without denaturing the goods.

Another object of the invention is to provide a process for the production of such a polyamide.

A further object of the invention is to provide an agents or material for imparting a gas-barrier property comprising such a polyamide.

SUMMARY OF THE INVENTION

It has now been found that a specific polyamide in which a part of the secondary amine linkages (—NH—) in the polymer chain is replaced with a tertiary amine linkage

so that it has a branched linear structure, has a combination of excellent properties including low water absorption, melt moldability, heat resistance, mechanical properties and particularly enhanced gas barrier property.

Thus, according to one aspect of the invention there is provided a polyamide comprising:

(a) from 60 to 100%, preferably from 60 to 85%, by mole of terephthaloylalkylenediamine constitutent units (a) of the general formula [I]:

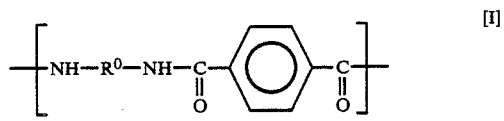

(b) from 0 to 40%, preferably from 15 to 40%, by mole of diacyloylalkylenediamine constituent units (b) of the general formula [III]:

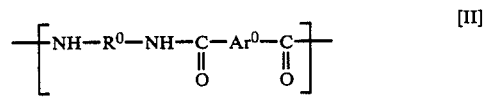

and (c) from 0.1 to 5%, preferably from 0.1 to 3%, by mole of trivalent diacyloylalkylenediamine constituent units (c) of the general formula [III] or [IV]:

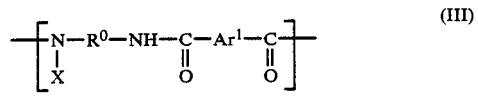

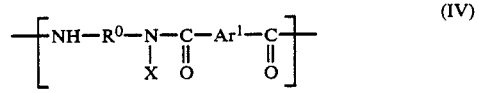

wherein $R^0$ is an alkylene group having from 6 to 18 carbon atoms, $Ar^0$ is a divalent aromatic hydrocarbyl group having from 6 to 12 carbon atoms other than 1,4-phenylene, $Ar^1$ is a divalent aromatic hydrocarbon group selected from 1,4-phenylene and $Ar^0$, the $R^0$, $Ar^0$ and $Ar^1$ appearing in the molecule respectively being the same or different, X is a member selected from the group consisting of said constituent units (a), (b) and (c), said constituent units (a), (b) and (c) being arranged at random to provide a branched linear structure, said polyamide being free from a gel-forming cross-linked structure and soluble in concentrated sulfuric acid and having:

(i) an intrinsic viscosity [η] of from 0.5 to 3 dl/g, as measured in concentrated sulfuric acid at a temperature of 30° C., (ii) a melting point of from 280° C. to 370° C. and a glass transition temperature of from 100° C. to 160° C., as measured by means of a differential scanning calorimeter at a heating rate of 10° C./min., and (iii) a crystallinity of from 10 to 30%, as measured by X-ray diffractometry.

In accordance with another aspect of the invention there is provided a process for the production of the above specified polyamide which process comprises the steps of polycondensing terephthalic acid and at least one aromatic dicarboxylic acid other than terephthalic acid with at least one aliphatic alkylenediamine having from 6 to 18 carbon atoms at a temperature where they are in melt, and polycondensing the oligomer so produced in melt under shear.

According to a further aspect of the invention there is provided a gas-barrier property imparting agent comprising the above specified polyamide.

The novel polyamide described herein has a combination of excellent properties including low water absorption, melt moldability, heat resistance, mechanical properties and excellent gas barrier property, and is particularly useful as a material of containers or vessels for storing beer and carbonated drinks.

DETAILED DESCRIPTION OF THE INVENTION

The invention will now be described in detail.

The polyamide according to the invention comprises the constituents units (a), (b) and (c). The constituent units (a) are introduced into polymer chains of the polyamide by reaction of terephthalic acid with at least one aliphatic alkylenediamine having from 6 to 18 carbon atoms.

Examples of the aliphatic alkylenediamines include, for example, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diaminooctane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminoonnonane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane and 1,12-diaminododecane. These aliphatic alkylenediamines can be used herein alone or in combination.

The constituent units (b) are introduced into polymer chains of the polyamide by reaction of at least one aromatic dicarboxylic acid other than terephthalic acid with at least one aliphatic alkylenediamine having from 6 to 18 carbon atoms.

Examples of the aromatic dicarboxylic acid other than terephthalic acid include, for example, isophthalic acid, phthalic acid, 2,6-naphthalenedicarboxylic acid, 2,5-naphthalenedicarboxylic acid, 1,4-naphthalenedicarboxylic acid, and 1,5-napthalenedicarboxylic acid. These aromatic dicarboxylic acids may be used alone or in combination.

The constituent units (c) are introduced into the polyamide by polycondensation of an oligomer, wherein the polycondensation is conducted in melt condition of the oligomer applying shearing stress to the oligomer, which oligomer comprises constituent units (a) and (b) defined above and can be prepared as described hereinafter. Incidentally, such units (c) are also formed to some extent during the step of preparing the above-mentioned oligomer. More particularly, the units (c) are introduced into the polyamide by polycondensation of an oligomer comprising constituent units (a) and (b) defined above in melt condition of the oligomer applying shearing stress to the oligomer, conveniently in a biaxial extruder equipped with a vent at a temperature of from 250° to 350° C., preferably from 280° to 370° C., while removing water formed by the polycondensation from the vent.

The process according to the invention for the production of the polyamide will now be described.

In the first step of the process according to the invention, an oligomer (low molecular weight polycondensate) comprising constituent units (a) and (b) defined above is prepared. The oligomer can be advantageously prepared by polycondensing terephthalic acid for forming the constituent units (a) and at least one aromatic dicarboxylic acid other than terephthalic acid for forming the constituent units (b) with at least one aliphatic alkylenediamine having from 6 to 18 carbon atoms under a temperature wherein the reactants are all melt, preferably at a temperature of from 210° to 300° C., more preferably from 230° to 280° C., in an inert gas atmosphere such as nitrogen under an elevated pressure of the order of from 5 to 85 kg/cm$^2$G., while removing liquid products such as water formed by the polycondensation from the bottom of a reactor by flashing the products. While the polycondensation is preferably carried out under elevated pressures, it may be carried out under atmospheric or reduced pressures, if desired.

Upon the polycondensation above, small amounts (e.g., from 0.01 to 5.0% by mole) of a monocarboxylic acid or a primary or secondary amine may be added to the reaction system. Further, upon the polycondensation above, small amounts (e.g., from 0.01 to 5.0% by mole) of phosphorous acid, hypophosphorous acid or a phosphite compound or derivatives thereof may be added to the reaction system.

The polycondensation is preferably continued until an oligomer having a molecular weight of from 300 to 2,000 is obtained.

The oligomer so obtained is dried and then polycondensed in melt condition applying shearing stress to the oligomer to provide the polyamide having the constituent units (c) in addition to the units (a) and (b).

The polyamide so prepared should contain tertiary amine units, i.e., the constituent units (c) in an amount of from 0.1 to 5%, preferably from 0.1 to 3%, more preferably from 0.1 to 2% by mole. The Melt Flow Rate (CMFR) of the polyamide, as measured at a temperature of 350° C. under a load of 2 kg, is preferably within the range of from 0.5 to 100.

The polyamide according to the invention has a branched linear structure in which the constituent untis (a), (b) and (c) are arranged at random, and is free from a gel-forming cross-linked structure and is soluble in concentrated sulfuric acid. The branched structure of the polyamide is formed by the presence of the trivalent diacyloylalkylenediamine constituent units (c) of the general formula [III] or [IV]. For example, to the tertiary nitrogen atom of the trivalent diacyloylalkylenediamine constituent unit of the general formula [III] or [IV], the carbonyl groups of the terephthaloylalkylenediamine constituent unit(a), diacyloylalkylenediamine constitutent unit (b) or trivalent diacyloylalkylenediamine constituent unit (c) or attached by amide linkage, thereby forming the branch.

The polyamide according to the invention is further characterized by
(i) an intrinsic viscosity [$\eta$] of from 0.5 to 3 dl/g, as measured in concentrated sulfuric acid at a temperature of 30° C.,
(ii) a melting point of from 280° to 370° C. and a glass transition temperature of from 100° C. to 160° C., as measured by means of a differential scanning calorimeter at a heating rate of 10° C./min., and
(iii) a crystallinity of from 10 to 30%, as measured by X-ray diffractometry.

The polyamide according to the invention has an excellent gas-barrier property, and thus, it is useful in applications where a gas-barrier property is particularly required. The polyamide according to the invention is used alone or in blend or lamination with other melt-moldable polymers such as nylon 6, nylon 66, polyethylene terephthalate, polycarbonates and polyolefins.

When the polyamide according to the invention is used in blend with another melt-moldable polymer, it is normally used in an amount of from 3 to 200 parts, preferably from 5 to 180 parts, more preferably from 5 to 150 parts by weight based on 100 parts by weight of the other polymer.

When the polyamide according to the invention is used in lamination with another melt-moldable polymer, the laminate is conveniently prepared by a multiple-layer coextrusion process and may have an arbitrary limination structure including A/B and B/A/B wherein A represents a layer of the polyamide according to the invention and B represents a layer of the other melt-moldable polymer. The thickness of the layer A is preferably at least 2 $\mu$m, more preferably at least 3 $\mu$m, and the most preferably at least 5 $\mu$m.

If desired, various organic or inorganic fillers which may be in the form of powder, plate, fiber and fabric may be incorporated in the polyamide according to the invention. Examples of such fillers include, for example, inorganic compounds in the form of powder and plate such as silica, alumina, silica-alumina, talc, diatomaceous earth, clay, kaolin, quartz, glass, mica, graphite, molybdenum disulfide, gypsum, red iron oxide, titanium dioxide, zinc oxide, aluminum, copper and stainless steel; fibrous inorganic compounds such as glass fiber, carbon fiber, boron fiber, ceramics fiber, asbestos fiber, potassium titanate whisker and stainless steel fiber and fabrics made of such fibers, and organic compounds in the form of powder, plate, fiber and fabric such as poly-p-phenylene terephthalamide, poly-m-phenylene terephthalamide, poly-p-phenylene isophthalamide, poly-m-phenylene isophthalamide, wholly aromatic polyamides, e.g., polycondensate of diaminodiphenyl ether with terephthalic acid and/or isophthalic acid and polycondensate of p-, and/or m-aminobenzoic acid, wholly aromatic polyamide imide, e.g., polycondensate of diaminodiphenyl ether with trimellitic ankydride and/or pyromellitic anhydride, wholly aromatic polyimides, polymers containing heteroaromatic rings, e.g., polybenzimidazole and polyimidazophenanthroline, and polytetrafluoroethylene. These fillers can be used alone or in combination. Further, these fillers treated with silane or titanium couplers may also be used.

Preferred particulate fillers are silica, silica-alumina, alumina, titanium dioxide, graphite, molybdenum disulfide and polytetrafluoroethylene. Of these, graphite, molybdenum disulfide and polytetrafluoroethylene are particularly preferred, since they enhance the wear resistance such as dynamic friction coefficient, taber friction and limit pressure and velocity value of final shaped articles. While the usable particulate fillers normally have an average particle size of from 0.1 m$\mu$. to 200$\mu$., those of an average size of from 1 m$\mu$. to 100$\mu$. are preferred in view of their effective enhancement of the above-mentioned wear resistance. The amount of the particulate fillers used is normally from 0.1 to 200 parts, preferably from 0.5 to 100 parts, and more particularly from 1.0 to 50 parts by weight based on 100 parts by weight of the polyamide.

Preferred fibrous organic fillers are poly-p-phenylene terephthalamide fiber, poly-m-phenylene terephthalamide fiber, poly-p-phenylene isophthalamide fiber, poly-m-phenylene isophthalamide fiber and that of a wholly aromatic polyamide such as a polycondensate of diaminodiphenylene ether with terephthalic acid and/or isophthalic acid, since they enhance mechanical properties such as tensile strength and Izod impact strength as well as thermal properties such as heat deformation temperature of shaped articles. Preferred fibrous inorganic fillers are glass fiber, carbon fiber and boron fiber, since they improve mechanical properties such as tensile strength, bending strength and bending modulus, thermal properties such as heat deformation temperature, and physicochemical properties such as water resistance. While the usable organic and inorganic fibrous fillers normally have an average length of from 0.1 to 20 mm, those of an average length of from 1 to 10 mm are preferred in view of their effective enhancement of melt-moldability of polymer compositions containing such fibrous fillers and of the above-mentioned mechanical and thermal properties of shaped articles. The amount of the organic and inorganic fibrous fillers used is normally from 3 to 200 parts, preferably from 5 to 180 parts, and more preferably from 5 to 150 parts by weight based on 100 parts by weight of the polyamide.

While the invention will be further described by the following examples, the invention is not restricted thereto. In examples, the following abbreviations are used:
TA: terephthalic acid
IA: isophthalic acid
HMDA: hexamethylene diamine

EXAMPLE 1

(Preparation of polyamide)

A 1 liter autoclave was charged with 116 g (0.7 mole) of TA, 49.8 g (0.3 mole) of IA, 118.32 g (1.02 moles) of HMDA, 1.22 g (0.01 mole) of benzoic acid, 71.20 g (20% by weight) of ion exchanged water and 0.21 g (0.002 mole) of sodium hypophosphite, and the autoclave was filled with nitrogen, and then heated to a temperature of 250° C., under stirring over a period of 3 hours. The reaction was further continued for one hour at that temperature under seal and stirring. At the end of the period, the stirring was stopped, the reaction mixture was withdrawn from the bottom of the autoclave by flashing with a differential pressure of 10 kg/cm². The solid product so obtained was dried overnight in a nitrogen atmosphere at a temperature of 50° C. under a reduced pressure of 100 mmHg to provide an oligomer.

The oligomer so obtained had a number average molecular weight of 560, a tertiary amine content of 0.1% by mole, and an intrinsic viscosity of 0.10 dl/g.

The oligomer was polycondensed in melt condition to provide a polyamide in a biaxial extruder (L/D=42) equipped with a vent, while removing water formed by the polycondensation through the vent to the exterior.

The polyamide so prepared had a tertiary nitrogen content of 0.8% by mole, MFR of 60 and an intrinsic viscosity [η] of 0.8 and was soluble in concentrated sulfuric acid and hexafluoroisopropyl alcohol.

In this and following examples, the composition of the components, glass transitions temperature (Tg), intrinic viscosity [η], MFR, crystallinity and gas-barrier property were determined as follows.

(a) Composition of polyamide

The composition of the polyamide and its precursor oligomer were determined by use of $^{13}$C NMR (Nuclear Magnetic Resonance) of their solutions in hexafluoroisopropyl alcohol and their elementary analysis.

(b) Glass transition temperature (Tg)

The glass transition temperature of the polyamide was determined by differential scanning calorimetry or the polyamide using MODEL DSC-2 supplied by Perkin-Elmer Company at a heating rate of 10° C./min.

(c) Intrinsic viscosity [η]

The intrinsic viscosity of the polymer was determined by measuring relative viscosities of 0.500 g/dl, 0.770 g/dl and 1.99 g/dl solutions of the polymer in 96% concentrated sulfuric acid at a temperature of 30° C. using an Ubbelohde's viscometer, calculating the corresponding specific viscosities and graphically determining the [η]. The polymer solutions in the concentrated sulfuric acid had been prepared also at a temperature of 30° C.

(d) MFR

The MFR of the polyamide was determined in accordance with Japanese Industrial Standard (JIS) K-7210 at a temperature of 350° C., under a load of 2 kg.

(e) Crystallinity

The crystallinity of the polyamide was determined by broad angle (2θ: from 70° to 3°) X-ray analysis of a pressed sheet of the polyamide using ROTOR FLEX 2075 supplied by Rigaku Denki K.K.

(f) Gas-barrier property

The oxygen and carbon dioxide permeability constants were measured at a temperature of 25° C. using OXITRAN and PERMATRON C-IV devices supplied by MOCON company, respectively.

(g) Amount of tertiary amine

The amount of tertiary amine of the polyamine or oligomer was determined by determining amounts of primary, secondary and tertiary amines by NMR analysis of its solution in hexafluoroisopropanol using a superconducting NMR device (Model GX-500. 125.7 MHz) and calculating the amount of the tertiary amine nitrogen based of the total amount of nitrogen.

EXAMPLES 2 AND 3

Example 1 was repeated except that the oligomerization was carried out by temperatures indicated in Table 1.

EXAMPLES 4 AND 5

Example 1 was repeated except that the dicarboxylic acids were used in proportions as indicated in Table 1.

COMPARATIVE EXAMPLE 1

Example 1 was repeated except that the oligomerization was carried out at temperatures of 310° C. The polyamide obtained was not completely soluble in concentrated sulfuric acid.

Results of Examples 1 to 5 and Comparative Example 1 are shown in Table 1.

TABLE 1

| | Ex. 1 | Ex. 2 | Ex. 3 | Ex. 4 | Ex. 5 | Comp.Ex. 1 |
|---|---|---|---|---|---|---|
| Material | | | | | | |
| Acid components (kind) | TA/IA | TA/IA | TA/IA | TA/IA | TA/IA | TA/IA |
| Acid components (mole ratio) | 70/30 | 70/30 | 70/30 | 60/40 | 80/20 | 70/30 |
| Oligomer | | | | | | |
| Temperature of oligomerization (°C.) | 250 | 230 | 280 | 250 | 250 | 310 |
| Amount of tertiary amine (mole %) | 0.1 | 0.1 | 2.5 | 0.1 | 0.1 | 7.3 |
| Polymer | | | | | | |
| Acid components (kind) | TA/IA | TA/IA | TA/IA | TA/IA | TA/IA | TA/IA |
| Acid components (mole ratio) | 70/30 | 70/30 | 70/30 | 65/35 | 80/20 | 70/30 |
| [ ] (dl/g) | 0.80 | 0.85 | 1.25 | 0.92 | 1.04 | 0.95 |
| MFR (g/10min) | 60 | 48 | 4 | 21 | 13 | 2 |
| melting point (°C.) | 325 | 325 | 323 | 307 | 345 | 319 |
| Tg (°C.) | 126 | 125 | 128 | 119 | 134 | 129 |
| Crystallinity (%) | 25 | 26 | 21 | 14 | 29 | 18 |
| Amount of tertiary amine (mole%) | 0.8 | 0.7 | 3.0 | 0.5 | 0.9 | 8.6 |

EXAMPLE 6 TO 10

Pellets of each of the polyamide prepared in Examples 1 to 5 were dried at a temperature of 100° C., under a reduced pressure of 1 mmHg for a period of 12 hours, hot pressed in a nitrogen atmosphere at a temperature of 20° C. above the Tm and under a pressure of 100 kg/cm², and cold pressed to a sheet having a thickness of about 100μ. The sheet was dried in a nitrogen atmosphere at a temperature of 100° C., under a reduced pressure of 40 mmHg for a period of 12 hours, and tested for its gas-barrier property.

COMPARATIVE EXAMPLE 2

The procedures of Example 6 were repeated except that pellets of the polyamide prepared in Comparative Example 1 were used.

COMPARATIVE EXAMPLE 3

The procedures of Example 6 were repeated except that polyethylene terephthalate (Mitsui PET J125 supplied by Mitsui PET Resin K.K.) was used instead of the polyamide.

Results of Examples 6 to 10 and Comparative Examples 2 and 3 are shown in Table 2.

scanning calorimeter at a heating rate of 10° C./min., and (iii) a crystallinity of from 10 to 30%, as measured by X-ray diffractometry.

TABLE 2

| | Gas-barrier property | | | | | | |
|---|---|---|---|---|---|---|---|
| | Example 6 | Example 7 | Example 8 | Example 9 | Example 10 | Comp. Example 2 | Comp. Example 3 |
| Polymer | Polyamide of Example 1 | Polyamide of Example 2 | Polyamide of Example 3 | Polyamide of Example 4 | Polyamide of Example 5 | Polyamide of Comp. Example 1 | PET |
| O$_2$ permeability constant (ml mm/m$^2$ day atm) | 2.5 | 2.3 | 2.6 | 2.1 | 2.6 | 5.7 | 4.6 |
| CO$_2$ permeability constant (ml mm/m$^2$ day atm) | 10.2 | 10.3 | 10.6 | 10.1 | 10.8 | 28.1 | 25.0 |

What is claimed is:

1. A polyamide comprising:
   (a) from 60 to 99.9 mol % of terephthaloylalkylenediamine constituent units (a) of the general formula (I):

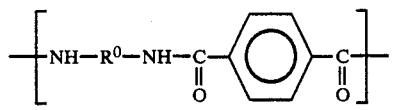

(b) from 0 to 39.9 mol % of diacyloylalkylenediamine constituent units (b) of the general formula (II):

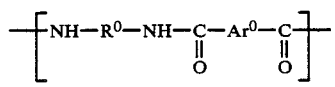

and
   (c) from 0.1 to 5 mol % of trivalent diacyloylalkylenediamine constituent units (c) of the general formula (III) or (IV):

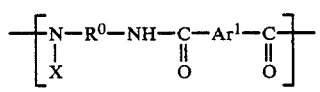

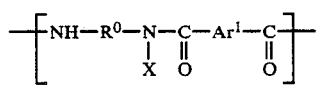

wherein $R^0$ is an alkylene group having from 6 to 18 carbon atoms, $Ar^0$ is a divalent aromatic hydrocarbyl group having from 6 to 12 carbon atoms other than 1,4-phenylene, $Ar^1$ is a divalent aromatic hydrocarbon group selected from 1,4-phenylene or $Ar^0$, X is a member selected from the group consisting of said constituent units (a), (b) and (c) attached to the tertiary nitrogen atom via a terminal carbonyl group, said constituent units (a), (b) and (c) being arranged at random to provide a branched linear structure, said polyamide being free from a gel-forming cross-linked structure and soluble in concentrated sulfuric acid and having:
   (i) an intrinsic viscosity [$\eta$] of from 0.5 to 3 dl/g, as measured in concentrated sulfuric acid at a temperature of 30° C.,
   (ii) a melting point of from 280° C. to 370° C. and a glass transition temperature of from 100° to 160° C., as measured by means of a differential 2. The polyamide according to claim 1 wherein said terephthaloylalkylenediamine constituent units are derived by a reaction of terephthalic acid with at least one aliphatic alkylenediamine having from 6 to 18 carbon atoms.

3. The polyamide according to claim 1 wherein said diacyloylalkylenediamine constituent units (b) are derived by a reaction of at least one aromatic dicarboxylic acid other than terephthalic acid with at least one aliphatic alkylenediamine having from 6 to 18 carbon atoms.

4. The polyamide according to claim 1 wherein said trivalent diacyloylalkylenediamine constitutent units (c) are derived by melt polycondensation of an oligomer comprising said constituent units (a) and (b).

5. A process for the production of a polyamide comprising:
   (a) from 60 to 99.9 mol % of terephthaloylalkylenediamine constituent units (a) of the general formula (I):

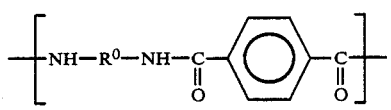

(b) from 0 to 39.9 mol % of diacyloylalkylenediamine constituent units (b) of the general formula (II):

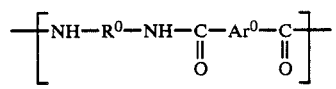

and
   (c) from 0.1 to 5 mol % of trivalent diacyloylalkylenediamine constituent units (c) of the general formula (III) or (IV):

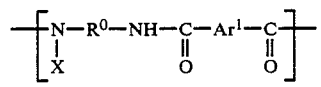

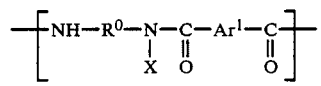

wherein $R^0$ is an alkylene group having from 6 to 18 carbon atoms, $Ar^0$ is a divalent aromatic hydrocarbyl group having from 6 to 12 carbon atoms other than 1,4-phenylene, $Ar^1$ is a divalent aromatic hydrocarbon group selected from 1,4-phenylene or $Ar^0$, X is a member selected from the group consisting of said constituent units (a), (b) and (c) attached to the tertiary nitrogen atom via a terminal carbonyl group, said constituent units (a), (b) and (c) being arranged at random to provide a branched linear structure, said polyamide being free from a gel-forming cross-linked structure and soluble in concentrated sulfuric acid and having:
- (i) an intrinsic viscosity [η] of from 0.5 to 3 dl/g, as measured in concentrated sulfuric acid at a temperature of 30° C.,
- (ii) a melting point of from 280° C. to 370° C. and a glass transition temperature of from 100° C. to 160° C., as measured by means of a differential scanning calorimeter at a heating rate of 10° C./min., and
- (iii) a crystallinity of from 10 to 30%, as measured by X-ray diffractometry, which process comprises the steps of melt polycondensing terephthalic acid and at least one aromatic dicarboxylic acid other than terephthalic acid with at least one aliphatic alkylenediamine having from 6 to 18 carbon atoms at a temperature of from 210° C. to 300° C., and melt polycondensing the oligomer so produced while applying shear stress to the oligomer.

6. The process according to claim 5 wherein said oligomer has a molecular weight of from 300 to 2,000.

7. An agent for imparting a gas-barrier property which comprises a polyamide comprising:
- (a) from 60 to 99.9 mol % of terephthaloylalkylenediamine constituent units (a) of the general formula (I):

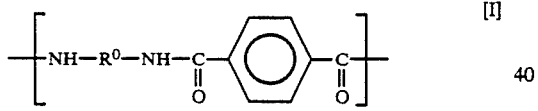

- (b) from 0 to 39.9 mol % of diacyloylalkylenediamine constituent units (b) of the general formula (II):

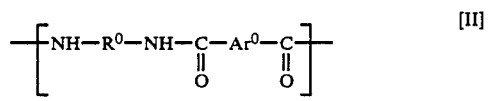

and
- (c) from 0.1 to 5 mol % of trivalent diacyloylalkylenediamine constituent units (c) of the general formula (III) or (IV):

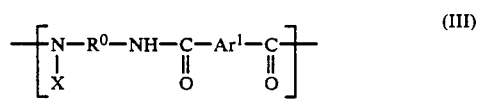

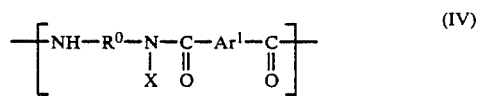

wherein $R^0$ is an alkylene group having from 6 to 18 carbon atoms, $Ar^0$ is a divalent aromatic hydrocarbyl group having from 6 to 12 carbon atoms other than 1,4-phenylene, $Ar^1$ is a divalent aromatic hydrocarbon group selected from 1,4-phenylene or $Ar^0$, X is a member selected from the group consisting of said constituent units (a), (b) and (c) attached to the tertiary nitrogen atom via a terminal carbonyl group, said constituent units (a), (b) and (c) being arranged at random to provide a branched linear structure, said polyamide being free from a gel-forming cross-linked structure and soluble in concentrated sulfuric acid and having:
- (i) an intrinsic viscosity [η] of from 0.5 to 3 dl/g, as measured in concentrated sulfuric acid at a temperature of 30° C.,
- (ii) a melting point of from 280° C. to 370° C. and a glass transition temperature of from 100° C. to 160° C., as measured by means of a differential scanning calorimeter at a heating rate of 10° C./min., and
- (iii) a crystallinity of from 10 to 30%, as measured by X-ray diffractometry.

* * * * *